United States Patent [19]

Billett

[11] Patent Number: 4,659,276
[45] Date of Patent: Apr. 21, 1987

[54] LOAD-HANDLING APPARATUS FOR A VEHICLE

[76] Inventor: Trevor G. Billett, Swan Creek, via Ulmarra, New South Wales 2462, Australia

[21] Appl. No.: 775,328

[22] Filed: Sep. 12, 1985

[30] Foreign Application Priority Data

Sep. 17, 1984 [AU] Australia .............. PG7170

[51] Int. Cl.$^4$ .............................................. B60P 1/54
[52] U.S. Cl. ........................... 414/543; 212/160;
212/188; 212/195; 212/223; 212/251; 212/254;
212/DIG. 1; 414/540; 414/719; 414/917
[58] Field of Search ........... 414/539, 540, 541, 542,
414/543, 560, 550, 553, 549, 546, 523, 719, 917;
212/160, 187, 188, 182, 159, 195, 223, 251, 254,
DIG. 1

[56] References Cited

U.S. PATENT DOCUMENTS

| | | | |
|---|---|---|---|
| 1,584,117 | 5/1926 | Mitchell | 212/182 X |
| 1,694,084 | 12/1928 | Straight | 212/160 |
| 2,461,401 | 2/1949 | Trombley | 414/543 |
| 2,746,620 | 5/1956 | Lindle | 414/546 |
| 2,755,943 | 7/1956 | Payne et al. | 212/160 X |
| 2,901,125 | 8/1959 | Troche | 212/187 |
| 3,063,574 | 11/1962 | Peterson | 414/1 |
| 3,176,861 | 4/1965 | Paul et al. | 414/543 |
| 3,494,489 | 2/1970 | Kruger | 414/543 |
| 3,796,331 | 3/1974 | Dutton | 414/550 X |
| 4,468,162 | 8/1984 | Kuromoto | 414/1 X |

FOREIGN PATENT DOCUMENTS 383586 10/1973 U.S.S.R. .................. 414/1

Primary Examiner—Frank E. Werner
Attorney, Agent, or Firm—Larson and Taylor

[57] ABSTRACT

A load handling apparatus for a vehicle has a mounting frame with a mast movable between a lowered travelling position and a raised working position. A boom carrier on the mast pivotally supports an articulated boom, which has a winch at its distal end. The winch cable is attached to a load carrying cradle which has handle bars to be gripped by the operator and the switch controls for the winch. The mast is counterbalanced by a spring and turnbuckles connect the boom carrier to the mounting frame and the mast to tilt the boom carrier in two directions if the vehicle is on uneven ground.

8 Claims, 3 Drawing Figures

LOAD-HANDLING APPARATUS FOR A VEHICLE

BACKGROUND OF THE INVENTION (1) Field of the Invention

This invention relates to load-handling apparatus for a vehicle.

(2) Prior Art

Difficulty is often encountered in loading and unloading heavy articles onto or from goods transporting vehicles, particularly when, as is often the case, the articles must be loaded or unloaded in remote areas where mechanical load-handling facilities are not available, and also when articles must be loaded or unloaded while the vehicle is necessarily located on sloping ground.

SUMMARY OF THE INVENTION

The present invention has been devised with the general object of overcoming or very materially reducing these disadvantages by providing load-handling equipment which can be readily applied to an existing transporter vehicle with little, if any, reduction in its goods carrying capacity. Other objects achievable in preferred embodiments of the invention are to provide such apparatus which can be quickly and easily brought to compact travelling position or extended to working position for loading articles from, or unloading them to, a wide area about the vehicle, which may be conveniently adjusted to compensate for slope on the ground on which the vehicle is standing and which is very simple and effective in operation.

With the foregoing and other objects in view, the invention resides broadly, in load-handling apparatus for a vehicle including a mounting frame applicable to a vehicle, a mast mounted on the mounting frame for movement between a lowered travelling position and a raised working position, a boom carrier movably mounted on the mast, a boom connected to the carrier for pivotal movement about an upright boom axis, adjustment means for adjusting the boom carrier relative to the mast to bring the boom axis vertical when the vehicle is on uneven ground, and a winch-operated lifting cable, with load attachment means, depending from the distal end of the boom. Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein.

DETAILED DESCRIPTION OF THE PREFERRED EMBODIMENTS

Figure 1:
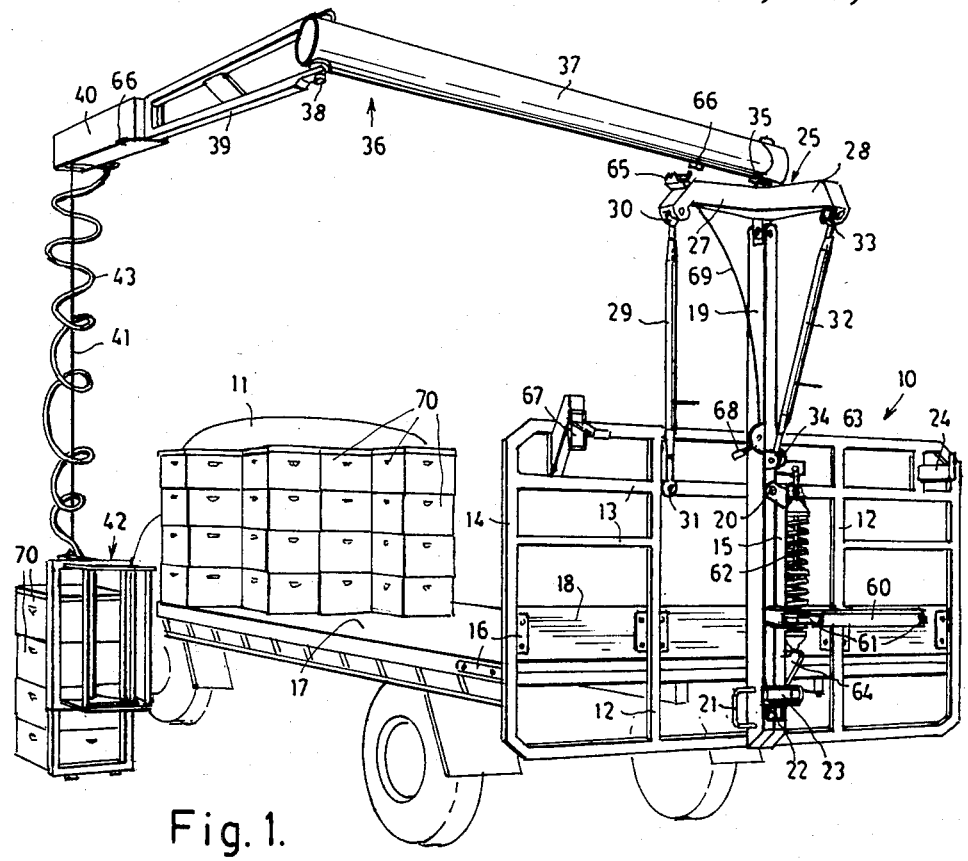
FIG. 1 is a perspective view of apparatus according to the invention applied to a truck, and in its loading or unloading position.

In the embodiment illustrated an upright mounting frame 10 is fixed across the rear of a conventional truck 11. The mounting frame is of gridded form with uprights 12 and laterals 13 within a rectangular peripheral frame 14. A central upright post 15 is fixed to the rear of the mounting frame 10, which has attachment brackets 16 whereby it is bolted to the truck's deck 17 and backboard 18.

Figure 2:
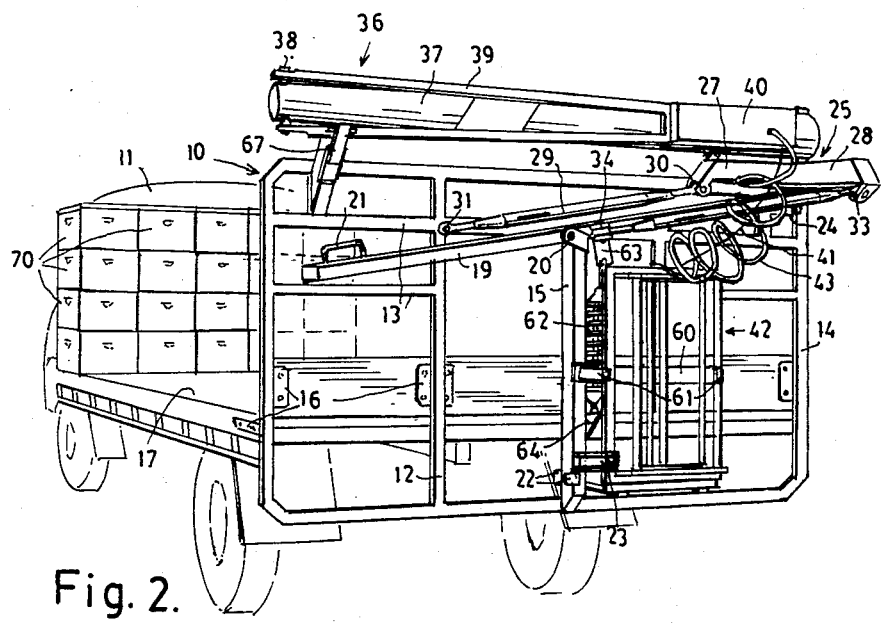
FIG. 2 is a further perspective view showing the apparatus in its folded or travelling position.

A mast 19 has its middle part pivoted, at 20, to the top of the post 15 so that by means of a handle 21, it may be swung up to working position, as shown in FIG. 1, adjacent to the post, its lower part between locating lugs 22 on the post and secured by a catch 23; or may be swung down to inclined travelling position, as shown in FIG. 2, its upper part being supported by a rest 24 at one side of the mounting frame.

A boom carrier 25, more or less L-shaped in plan view, has its central or angle part connected by a universal joint at 26 to the head of the mast 19, a side arm 27 of the boom carrier extending to one side of the universal joint 26, a rear arm 28 extending to the rear. A lateral levelling turnbuckle 29 has ball-and-socket connections to the side arm 27 and the main frame 10 at 30 and 31 respectively. A longitudinal levelling turnbuckle 32 has ball-and-socket connections, at 33 and 34, to the rear arm 28 of the boom carrier and to the mast 19. When the mast 19 is erect, the boom carrier 25 may be brought to horizontal by adjustment of the lateral and longitudinal levelling turnbuckles 29 and 32. When the mast is lowered to its travelling position, the turnbuckles 29 and 32 serve as parallel-motion links so that, as shown in FIG. 2, the boom carrier 25 remains substantially horizontal.

Fixed perpendicularly on the boom carrier 15 is a boom pivot 35, so located that, when the mast 19 is erect the boom pivot 35 is directly above it. An articulated boom 36 is mounted on and extends from this pivot. The boom consists of a tubular first section 37 which has at one end a bearing for the pivot 35, and at its other end is pivoted, at 38 to a second section 39. The second boom section is an open frame carrying at its distal end a housing 40 for an electric winch (not shown) from which there depends a lifting cable 41 connected to a loading cradle 42. The electric winch is powered from the truck's electrical system or from an appropriate power-pack (not shown) carried on the truck, the electrical leads (not shown) for the winch being carried up through the post 15, the mast 19 and through the two boom sections 37 and 39. The winch may be started, stopped and reversed by switch gear incorporated, as later described, in the loading cradle 42, the electrical leads from the switch to the circuit of the winch being within a flexible conduit 43 spiralled around the lifting cable 41.

Figure 3:
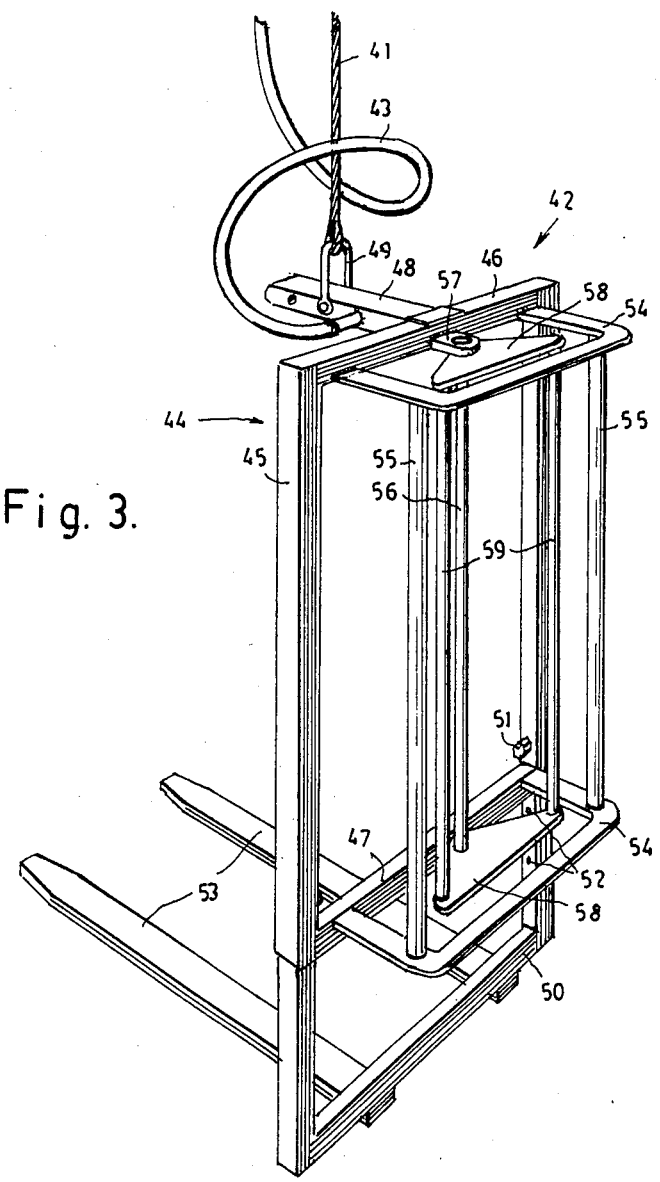
FIG. 3 is a perspective view of the loading cradle of the apparatus.

The loading cradle 42, as shown particularly in FIG. 3, includes a rectangular backing frame 44 comprising tubular sides 45, top 46 and bottom 47. An arm 48 which extends forwardly from the middle of the top piece 46 is fitted with a shackle 49 to which the lifting cable 41 is made fast. A U-shaped adjustment frame 50 has its sides slidable in the tubular sides 45 of the backing frame and releasably locked in desired adjusted position by bolts 51 through the backing frame sides 45 and selected holes 52 in the sides of the adjustment frame. A pair of lifting arms 53 extend forwards from the bottom of the adjustment frame.

Extending rearwards from the top and bottom members 46 and 47 of the backing frame are two similar U-shaped handle frames 54 between the sides of which are secured a pair of upright handle bars 55.

A shaft 56 pivoted in brackets 57 behind the top and bottom members 46 and 47 of the backing frame carries a pair of rocker arms 58 interconnected at their sides by a pair of switch control bars 59, each fairly close to one of the handle bars 55. Within the tubular top member 46 of the backing frame 42 is the switch gear (not shown) for the electric winch, the leads within the flexible conduit 43 being conveyed through the arm 48 to the switch which is acted on by pivotal movement of the rocker arms 58 in one direction from central position to operate the winch so as to lift the cradle and on movement of the rocker arm in opposite direction to cause the winch to lower the cradle.

Behind the mounting frame 10 there is secured a cradle holder bracket 60. When the loading cradle 42 is not required for use it may be brought against this bracket and held to it by catches at 61, the lifting arms 53 of the cradle passing through the mounting frame 10 and resting on the bottom of its peripheral frame 14.

To bring the apparatus to its travelling or folded position as shown in FIG. 2, the first bottom section 37 is swung to laterally extending position and the second boom section 39 is swung to lie close behind the first section, a double catch 65 on the side arm 27 of the bottom carrier 25 automatically engaging and holding dees 66 on both the first boom section 37 and the winch housing 40. The catch 23 retaining the mast 19 upright is released and by means of the handle 21 the counterbalanced mast and folded boom are swung to lowered position, the mast being supported by the rest 24 at one side of the mounting frame 10, a catch 67 at the other side of the mounting frame being engaged with the boom second section 39 near to the pivot 38. The loading cradle 42 is supported on the mounting frame 10 and secured by the clips 61 of the bracket 60.

To bring the apparatus to its operating position the catch 67 is released and the mast is swung to upright position and retained by the catch 23. The loading cradle 42 is disengaged from the mounting frame and the double catch 65 is released, by a release lever 68 on the mast and connected to the catch by a flexible control cable 69. The boom carrier 25 is brought to horizontal, and thus the boom pivot 35 is brought vertical, by adjustment of the levelling turnbuckles 29 and 32, and to assist in this a levelling gauge (not shown) of any suitable type may be provided on the boom carrier. The sections 37 and 39 of the articulated boom 36 will then swing freely to follow the loading cradle 42 as it is moved manually to any desired position, within or some distance outside the reach of the boom, to bring the cradle to a load, such as the bee boxes indicated at 70, for the purpose of unloading them from, or loading them onto, the truck tray 17. The cradle may be easily handled by grasping the handle bars 55 and switch control bars 59, movement of one of the control bars 59 towards the nearer handle bar 55 causing the cradle to be raised, movement of the other bar 59 to the other handle bar 55 causing the cradle to be lowered. The lifting arms 53 may be inserted under the load positioned on the truck or on the ground, the cradle then being lifted by the winch and manoeuvred and lowered to the required position.

Because of the reach of the boom, the apparatus can load and unload a trailer drawn by the truck as well as the truck itself.

The embodiment of the invention described and illustrated may, of course, be modified to suit different applications and requirements. For example, the mounting frame may be applicable to the front, or a side, of the tray or platform of a vehicle, and the cradle may be modified to carry other loads, such as palletised goods. These and many other modifications of constructional detail and design, which will be readily apparent to persons skilled in the art, are considered to lie within the scope of the invention hereinafter claimed.

I claim:

1. Load handling apparatus for a vehicle including:
   a mounting frame applicable to a vehicle,
   a mast pivotally mounted on the mounting frame for movement between a lowered generally horizontal travelling position and a raised generally vertical working position,
   said mast moving in a plane that is substantially parallel to a plane containing the mounting frame,
   a substantially horizontally-oriented boom carrier universally mounted for pivotal movement on the mast,
   a boom connected to the boom carrier for horizontal pivotal movement about an upright boom axis,
   adjustment means for adjusting the boom carrier relative to the mast to bring the boom axis vertical by levelling the boom carrier laterally and longitudinally,
   said adjustment means includes first and second members pivotally attached to said boom carrier at one end and pivotally attached at another end to said mounting frame, both of said members being movable in cooperation with said mast between said lowered generally horizontal travelling position and said raised generally vertical working position, and
   a winch-operated lifting cable, with load attachment means, depending from the distal end of the boom.

2. Apparatus according to claim 1 further comprising: locking means for holding the mast in its upright generally vertical working position and the mast's pivotally lowered generally horizontal travelling position.

3. Apparatus according to claim 2 wherein:
   a counterbalancing spring is connected between the mast and the mounting frame.

4. Apparatus according to claim 1 wherein:
   the boom is articulated, comprising two sections interconnected by a pivot parallel to the boom pivot.

5. Apparatus according to claim 1 wherein:
   the lifting cable extends from an electric winch within a housing at the distal end of the boom.

6. Apparatus according to claim 5 wherein:
   the load attachment means includes a loading cradle, and
   a control switch for the winch is provided on the cradle.

7. Apparatus according to claim 6 wherein the loading cradle includes;
   handle bars for the manual maneuvering of the cradle, and
   switch control members adjacent to the handle bars for operating the control switch, one to cause the winch to lift the cradle, the other to cause the winch to lower the cradle.

8. Apparatus according to claim 1 wherein said load attachment means includes a loading cradle which comprises:
   a load carrying frame,
   switch gear for operating said winch to lift or lower the cradle mounted on said frame,
   handle bars for the manual maneuvering of said cradle mounted on said frame, and
   switch control members mounted adjacent to said handle bars.

* * * * *